Dec. 7, 1965                    E. L. KILBOURN                    3,221,540
                                MECHANICAL DEVICE
                              Filed Aug. 12, 1963
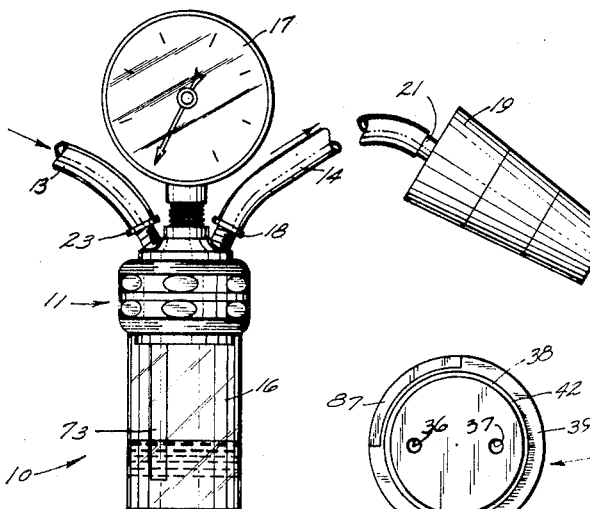
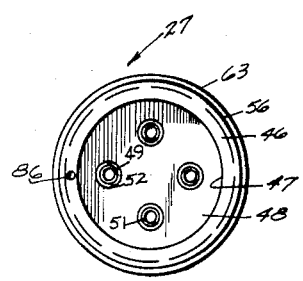
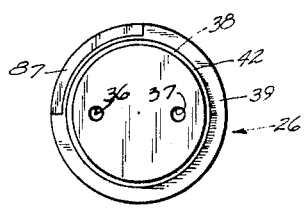
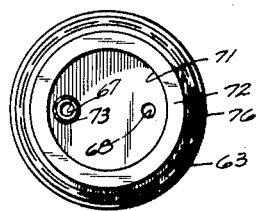
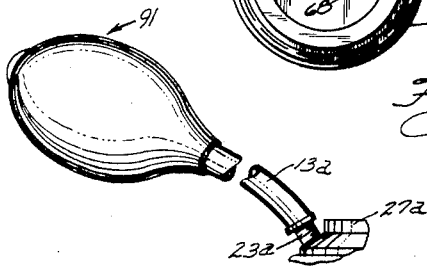
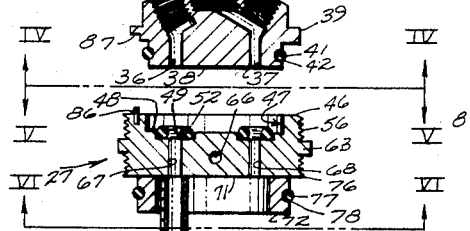
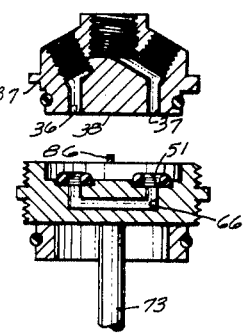
INVENTOR.
EUGENE L. KILBOURN
BY
Woodhams, Blanchard & Flynn
ATTORNEYS

United States Patent Office 3,221,540
Patented Dec. 7, 1965

3,221,540
MECHANICAL DEVICE
Eugene L. Kilbourn, Marengo Township, Calhoun County, Mich., assignor to S. H. Leggitt Company, Marshall, Mich., a corporation of Michigan
Filed Aug. 12, 1963, Ser. No. 301,541
4 Claims. (Cl. 73—49.1)

This invention relates to a device for detecting gas flow of small magnitude and, more specifically, it relates to a gas leak detector for detecting gas leakage from a pressurizable system.

The device of the invention was designed for detecting leaks in a pressurized gas system such as a pipe line carrying natural or manufactured gas or such as the gas piping in a dwelling. However, the invention will be seen to be applicable to a multitude of other situations wherein gas flow is to be monitored or gas leakage from a pressurized system is to be detected.

Previous devices and methods for leak detection have included the use of a conventional, dial-type gas pressure gauge communicating with a pressurized system. Leaks are indicated by a drop in the pressure reading of the gauge. Generally, a leak which is small compared to the volume of the system results in a very slow rate of pressure drop so that movement of the gauge needle is undetectable at a single inspection and can only be detected by a pair of observations well spaced in time. Thus, such a device becomes impractical when the system volume is large compared with the amount of gas lost through leakage in a given period and when it is desired that a leak be immediately detectable.

Other means of leak detecting include soaping of joints wherein gas leakage causes a soap bubble to be formed and the use of ultrasonic receiving equipment capable of detecting high-frequency sound caused by pressure leaks. Such methods generally require access and attention to every joint or place of potential leakage in the system. Thus, such methods are unreliable, time consuming and inefficient for indicating the mere existence of the leak although such methods are useful in precisely locating a leak after its existence has been established by other means.

It has been further noted that existing equipment used in gas leak detection is often expensive, clumsy or inefficient in operation and/or incapable of detecting leakage of a small magnitude within acceptable time limits.

Accordingly, the objects of this invention include:

(1) To provide a device for detecting gas flow of small magnitudes.

(2) To provide a device, as aforesaid, for detecting the existence of small gas pressure drops in a pressurized system.

(3) To provide a device, as aforesaid, for detecting the existence of gas leaks in a system pressurized at any of a wide range of pressures.

(4) To provide a device, as aforesaid, which is inserted between a source of gas pressure and the system to be tested for leakage.

(5) To provide a device, as aforesaid, which includes means comprising a gas pressure source suitable for leak testing and includes a gauge for ascertaining the nominal pressure applied to a system.

(6) To provide a device, as aforesaid, which contains a minimum number of parts most of which are widely available stock parts and the rest of which are inexpensively and quickly fabricated, which is rapidly assembled by relatively unskilled personnel with a minimum training and which may be produced singly or in large lots at low cost.

(7) To provide a device, as aforesaid, which is easily operated by personnel having little training, which indicates in an obvious and rapid manner the existence of a leak, which is instantly adaptable to connection with a wide variety of source and system fitting types and sizes and which may be used in the absence of the gas source which will eventually supply the system when the system is placed in normal operation.

(8) To provide a device, as aforesaid, which is durably constructed, easily and quickly serviced by essentially unskilled personnel, for which the parts most subject to wear are standard and widely available and which will have a long operating life with a minimum of maintenance.

Other objects and purposes of this invention will become apparent to persons familiar with this type of equipment upon reading the following descriptive material and examining the accompanying drawings, in which:

FIGURE 1 is a fragmentary, front elevational view of a device embodying the invention.

FIGURE 2 is an exploded, central cross-sectional view of a fragment of FIGURE 1.

FIGURE 3 is a fragment of FIGURE 2 showing parts thereof in a different operative position.

FIGURE 4 is a sectional view taken on the line IV—IV of FIGURE 2.

FIGURE 5 is a sectional view taken on the line V—V of FIGURE 2.

FIGURE 6 is a sectional view taken on the line VI—VI of FIGURE 2.

FIGURE 7 is a modified fragment of FIGURE 1.

For convenience in description and not for purposes of limitation, certain terminology will be used in the following description. The terms "upwardly," "downwardly," "rightwardly," "leftwardly," "frontwardly" and "rearwardly" will have reference to the device of the invention as it appears in FIGURES 1, 2 and 7. The terms "inwardly" and "outwardly" will have reference to the geometric center of the apparatus and parts thereof. Said terminology will include the words above specifically mentioned, derivatives thereof and words of similar import.

General description

The objects and purposes of the invention, including those set forth above, have been met by providing a leak detector including a valve actuatable to connect a source of gas pressure through a conventional dial-type pressure gauge to a system to be filled with gas. Said valve is alternately actuable to connect a pressure source through a liquid bath contained in a transparent container to the pressurized system. A leak in said system will cause a pressure drop therein which is compensated for by gas flowing from the source through the bath and into the system. Hence, the bubbling of gas through the bath provides a visual indication of the existence of a leak in the pressurized system.

Detailed description

The leak detector 10 (FIGURE 1) which has been chosen to illustrate a preferred embodiment of the invention, includes a valve assembly 11. The valve assembly 11 is actuatable to connect a gas inlet line 13 to a gas outlet line 14 through a detection chamber 16. The valve assembly 11 also supports a standard dial pressure gauge 17 for monitoring the gas pressure in the outlet line 14.

The outlet line 14 preferably comprises a flexible hose of any convenient material such as rubber having at one end thereof a standard threaded fitting 18 for attachment to the valve assembly 11 and having at the other end thereof suitable means for connecting same to a system to be pressurized. Such means are here shown for illustrative purposes as a truncated conical resilient stopper 19 which closely surrounds and is secured to a preferably rigid tube 21 over which the free end of the outlet line 14 is secured. Hence, the outlet line 14 may be secured to the system to be tested by inserting the stopper 19 into a suitable opening (not shown) in such system. Said system may, for example, be the combustible gas piping system of a dwelling. The inlet line 13 is similarly attached to the valve assembly 11 through a fitting 23 which is preferably identical to the fitting 18 hereinabove described. The inlet line 13 is connected to a source of gas under pressure, which may be the gas source normally used to supply a dwelling with combustible gas, for example, and the line 13 may be attached thereto by means similar to the tube 21 and stopper 19 hereinabove described.

The valve assembly 11 includes an upper body member 26 (FIGURE 2) and a lower body member 27. The upper body member 26 is of circular cross section and contains, in the upper portion thereof, threaded openings 31 and 32 for receiving thereinto the fittings 23 and 18, respectively. The upper body member 26 also contains a threaded opening 23 for attaching the gauge 17 thereto. A passage 36 extends from the threaded opening 31 through the lower axial face 38 of the body member 26 and a further opening 37 connects the threaded openings 32 and 33 and extends therefrom through said lower axial face 38. The lower axial face 38 of the upper body member 26 preferably defines a radial plane and the passages 36 and 37 preferably open therethrough at locations diametrically opposed across and equally spaced from the center thereof (FIGURE 4). The upper body member 26 has an integral, radially outwardly extending annular flange 39 (FIGURE 2) between its axial ends. An annular groove 41 is placed in the upper body member 26 between the flange 39 and the lower face 38 thereof for partial reception thereinto of a resilient sealing ring 42 which may be a conventional rubber O-ring and which extends slightly radially outwardly of the adjacent circumferential surface of the upper body member 26.

The lower body member 27 is of circular cross section and has an axially upper face 46 (FIGURES 2 and 5) containing coaxial therewith a preferably right cylindrical recess 47. The axial face 48 of the recess 47 contains two pair of relatively shallow, seal recesses 49 and 51. The seal recesses 49 define a diameter of the face 48 and are centered thereon. The seal recesses 51 define another diameter of the face 48, are also centered thereon and define with the recesses 49 a circle centered on the face 48. The recesses 49 and 51 are preferably, as is here shown, equally circumferentially spaced from each other. Preferably identical, resilient rings 52 which are preferably conventional O-rings of any convenient material such as rubber, lie in the seal recesses 49 and 51 and are prevented from movement parallel to the plane of the recess face 48 by the peripheral walls of said seal recesses 49 and 51. The O-rings 52 extend upwardly above the face 48. The recess 47 is of such diameter and depth that the lower portion of the upper body member 26 may be inserted thereinto whereby the lower face 38 of the upper member 26 rests against the O-rings 52, whereby the O-ring 42 of the upper member 26 is in firm, resilient contact with the circumferential wall of the recess 47 and wherein the flange 39 of the upper member 26 is adjacent to but preferably slightly spaced above the upper face 46 of the lower member 27. The lower body member 27 has external threads 56 adjacent the upper face 46 thereof which are engageable by internal threads of a conventional lock nut 58 whereby the central opening 59 of the lock nut 58 passes over and surrounds the upper portion of the upper body member 26 and whereby the radially inwardly extending flange 61 on said lock nut 58 bears downwardly against the flange 39 on the upper body member 26 to urge the lower face 38 of said upper body member 26 downwardly against said O-rings 52 as said lock nut 58 is threaded onto the threads 56 on the lower body member 27. The lower body member 27 has a radially outwardly extending flange 63 for limiting the downward extent of motion of the lock nut 58.

The distance between the seal recesses 49 and between the seal recesses 51 are equal to the spacing between the openings of the passages 36 and 37 through the lower face 38 of the upper body member 26. The upper body member 26, when secured as above described to the lower body member 27, may be rotated with respect thereto whereby to bring the passages 36 and 37 into communication with the pair of recesses 49 in one rotational position thereof and to bring said passages 36 and 37 into communication with the pair of recesses 51 in another rotational position thereof. The O-ring 42 assures that no gas contained in the passages 36 and 37 will escape to the atmosphere and the O-rings 52 assure that the recess 47 and the recesses 49 and 51 will be adequately sealed from one another during rotation of the upper body member 26 with respect to the lower body member 27.

A passage 66 connects the seal recesses 51 to each other. Passages 67 and 68 connect respective ones of the seal recesses 49 with a recess 71 in the bottom face 72 of the lower body member 27. The passage 67 communicates with an elongated tube 73 which is fixed by any convenient means such as soldering to the axial face of the recess 71. The passage 68 communicates freely with the upper end of the detection chamber 16.

The lower body member 27 has further external threads 76 below the flange 63 thereon. The portion of the lower body member 27 below the threads 76 is of reduced diameter, is of generally cylindrical shape and has an annular groove 77 therein for reception thereinto of a resilient ring 78 such as a conventional rubber O-ring 78.

The detection chamber 16 comprises a transparent reservoir or bottle having its widest portion and opening at the top thereof. The reservoir 16 has an annular flange 81 at the top thereof which flange has a lower face defining a radial plane. The diameter and axial position of the flange 81 and the inside diameter of the mouth of the reservoir 16 are such that the lower portion of the lower body member 27 may be inserted into the mouth of the reservoir 16 whereby the O-ring 78 firmly and resiliently effects sealing contact with the inside of said reservoir 16 and whereby the upper end of the reservoir 16 moves into a position adjacent to but preferably spaced from the threaded portion 76 of the lower body member 27. A lock nut 82, which is similar to and preferably identical to the lock nut 58, has a central opening 83 capable of receiving the reservoir 16 therethrough and has a radially inwardly extending flange 84 for gripping the flange 81 of the reservoir 16 for urging said reservoir 16 toward said lower body member 27. The lock nut 82 is internally threaded for threaded engagement with the threads 76 of the lower body member 27 whereby to hold the reservoir 16 connected to the lower body member 27. The flange 63 prevents overtightening of the lock nut 82 just as it prevents overtightening of the lock nut 58.

When the leak detector is assembled in the manner hereinabove described, the tube 73 extends downwardly into the reservoir 16. The reservoir 16 is filled with any convenient liquid, such as water, sufficiently far that the lower end of the longer tube 73 is submerged and whereby the lower end of the passage 68 is spaced from said liquid.

If desired, means may be supplied whereby rotation of the upper body member 26 with respect to the lower body member 27 is limited to a finite angle such as approximately 90 degrees whereby each of the passages 36 and 37 may be moved into contact with only two of the seal recesses of the pairs 49 and 51 and, hence, with only passage 66 or with the passages 67 and 68 in the lower body member 27. In the particular embodiment disclosed, the passage 36 is constrained to communicate with either the passage 67 or one end of the passage 66 whereas the passage 37 is constrained to communicate with, respectively, either the passage 68 or the other end of the passage 66. Furthermore, the end points of the angle through which the upper body member 26 may be rotated with respect to the lower body member 27 is made to coincide with the above-mentioned communication possibilities. Though such motional constraints may be achieved in any of several ways, the embodiment herein disclosed includes a pin 86 projecting above the upper face 46 of the body member 27, said pin being located, for example, on a radius centered on the axial face 48. An arcuate slot 87 is centered in the flange 39 of the upper body member 26 at a radius equal to that locating the pin 86 on the face 46. The slot 87 is of sufficient depth so that the pin 86 does not bottom therein whereby the interaction between the pin 86 and the slot 87 will allow the above-described possible locations of the passages 36 and 37 with respect to the passages 66, 67 and 68.

*Operation*

Although the operation of the above-disclosed device has been indicated somewhat above, the same will be further detailed hereinbelow for purposes of clearer understanding. Assuming the reservoir 16 to be filled with a suitable liquid such as water at a level similar to that indicated in FIGURE 1, assuming the passages 36 and 37 to be connected through the passage 66 and assuming the gas outlet line 14 to be connected to the gas system (not shown) to be tested, the gas inlet line 13 may be connected to any convenient source of gas under pressure. Gas will then flow through the inlet line 13, through the passages 36, 66 and 37 (FIGURE 3), and out the outlet line 14 into the system to be tested whereby said system may be charged with gas to a desired pressure. The gauge 17 is connected by the passage 37 to the outlet line 14 and indicates the gas pressure in the line 14 and, hence, in the system to be tested. Hence, the gauge 17 indicates when charging is complete by cessation of movement of the indicator needle thereof. When the system is thus fully charged with gas, it may be tested for leakage by rotating the upper body member 26 with respect to the lower body member 27 whereby the passage 36 will connect the inlet line 13 through the long tube 73 with the liquid in the receptacle 16. The passage 68 is simultaneously connected to the passage 37 and through the outlet line 14 to the system to be tested.

Leakage of said system even of an amount of gas sufficiently small as to lower the pressurized system by an increment unobservable on the standard pressure gauge 17 will nevertheless cause such lost volume of gas to be replaced by gas from the source. Such gas will flow through the line 13 and passages 36 and 67 into the long tube 73 and will bubble through the liquid in the receptacle 16. The passage of said bubbles will be visible evidence of gas passage through the detector 10 and will in this case connote the presence of a leak in the system. The rate at which gas is seen to bubble through the liquid in the receptacle 16 is proportional to the rate at which gas is being lost through leakage and enables an observer to make a qualitative judgment of the size and seriousness of the leak. The gas source may now be shut off and the detector 10 disconnected therefrom and from the system to be tested. A reverse rotation of the upper body member 26 with respect to the lower body member 27 returns the detector to its starting configuration whereby another checking sequence may be begun on another system if desired.

*Modifications*

In the absence of a conventional gas pressure source such as that which is intended to supply the system to be tested in normal operation, it is necessary to pressurize the system for leakage testing by other means. Such a need is met by a hand-actuatable, resilient, bulb pump 91 of which examples are currently widely commercially available. The bulb 91 preferably has valved inlet and outlet openings whereby compression of the bulb forces gas, such as air, out the outlet and relaxation of the compressive forces allows the bulb to expand, pulling air in through said inlet. Said outlet is connected to the inlet line 13a and hence to the upper body member 26. Compression of the bulb 91 forces air through the passages 36, 66 and 37 in the detector 10 and into the system. Hence, a few pumps of bulb 91 will provide a pressure higher than ambient pressure in the system. When testing for existing leaks with the detector 10 of this invention, a gas pressure applied to the system which is only slightly over ambient pressure will be sufficient to disclose the presence of a leak. Hence, an undue amount of pumping of the bulb 91 is not required to sufficiently charge the system with air for purposes of leak testing. After the system has been so charged, the upper body member 26 is rotated with respect to the lower body member 27 whereby the passage 36 connects through the long tube 73 with the liquid bath in the reservoir 16 and whereby the reservoir 16 connects through the passage 68 to the passage 37 and to the system. Thus, any drop in pressure to the system occasioned by a leak therein will cause the above ambient pressure within the bulb 91 and inlet line 13a to bubble air through the bath in the reservoir 16 and hence indicate the presence of a leak. The bulb 91 and line 13a thus constitute an effective constant volume source of gas pressure whereas the source normally supplying a gas system such as that of a dwelling, which type is described hereinabove in connection with the primary embodiment of the invention, is a constant pressure source. Hence, the detector 10 functions with either a constant volume or constant pressure source.

Although the device of the invention will detect small leaks in relatively small systems, it is particularly valuable in detecting small leaks in systems of large volume, such detection being nearly impossible with a standard pressure gauge in a finite amount of time. This is because the device of the invention is primarily an amount change sensitive device and may be considered volume dependent whereas a standard dial-type pressure gauge is a pressure sensitive device.

Although a particular preferred embodiment of the invention has been disclosed above in detail for illustrative purposes, it will be understood that variations or modifications of such disclosure, which lie within the scope of the appended claims, are fully contemplated.

What is claimed is:

1. In a gas leak detector for connection between a source of gas under pressure and a system to be tested, the combination comprising:

a first body member having one passage therein connected to said source and another passage therein connected to said system, both said passages opening through the same face of said first body member;

a second body member having first, second, third and fourth passages opening through a face thereof adjacent said first body member, said body members being movable with respect to each other such that said one and another passages in said first member are respectively alignable with said first and second passages and said one and another passages in said first member are alternatively alignable with third and fourth passages in said second body member, said first and second passages being interconnected and said third and fourth passages being independent within said second body member;

indication means connected to said third and fourth passages;

whereby when said first and second passages are aligned with said one and another passages in said first member, said system will be charged from said source and when said third and fourth passages are aligned with said one and another passages in said first member, said source will be connected to said system through said indication means.

2. The device defined in claim 1 wherein said first body member telescopes within a recess in said second body member; and
means constraining said first body member to remain telescoped within said second body member;
including first sealing ring means telescoped between said first body member and the circumferential wall of said recess in said second body member to prevent egress of gas from said recess therepast;
a small sealing ring transversely fixed with respect to each of said first, second, third and fourth passages in said second body member, coaxial with said passages, and located between the adjacent axial surfaces of said first and second body members whereby upon appropriate rotation of said first and second body members with respect to each other, each of said passages in said first body member will align with a passage in said second body member through a small sealing ring for preventing leakage of gas at the joint of said one and another passages with the passages in said second body member connected thereto.

3. In a gas flow detector for location between a source of gas under pressure and a system to be fed thereby, the combination comprising:
indicating means;
inlet means connected to said source and outlet means connected to said system;
valve means connected between said inlet and outlet means having at least first and second selectable positions, whereby said valve means in its said first position directly connects said inlet means with outlet means and in its said second position connects said inlet means with said outlet means through said indicating means;
said indicating means comprising a closed chamber having walls at least partially transparent and being partially filled with liquid;
a tube extending from said valve means into said liquid; and
passage means communicating from said valve means with said chamber but being spaced from said liquid;
whereby gas from said source may be diverted by said valve means when same is in its said second position into said tube and whereby also said passage means is then connected by said valve means to said system so that gas flowing from said source to said system will bubble through said liquid.

4. In a gas flow detector for location between a source of gas under pressure and a system to be fed thereby, the combination comprising:
indicating means;
inlet means connected to said source and outlet means connected to said system;
valve means connected between said inlet and outlet means having at least two selectable positions whereby said valve means, in one of said positions directly connects said inlet means with outlet means and in another of said positions connects said inlet means with said outlet means through said indicating means;
said valve means including a first member having an inlet passage and an outlet passage therein and a second member having a first pair of passages which are joined to each other and a second pair of passages connected to said indicating means whereby in said one position said inlet and outlet passages in said first member are connected by said first pair of passages in said second member and said inlet and outlet passages in said first member are connected by said second pair of passages in said second member to said indicating means when said valve is in said another position.

References Cited by the Examiner
UNITED STATES PATENTS

| | | | |
|---|---|---|---|
| 1,777,152 | 9/1930 | Poteet | 137—625.31 X |
| 2,968,474 | 1/1961 | Eichelman | 137—625.31 X |
| 3,103,910 | 9/1963 | Smith | 73—40 |

ISAAC LISANN, *Primary Examiner.*